(12) United States Patent
Alao

(10) Patent No.: US 7,221,757 B2
(45) Date of Patent: May 22, 2007

(54) METHOD AND SYSTEM FOR ACCELERATED DATA ENCRYPTION

(75) Inventor: Rachad Alao, Sunnyvale, CA (US)

(73) Assignee: OpenTV, Inc., San Francisco, CA (US)

( * ) Notice: Subject to any disclaimer, the term of this patent is extended or adjusted under 35 U.S.C. 154(b) by 796 days.

(21) Appl. No.: 10/219,845

(22) Filed: Aug. 15, 2002

(65) Prior Publication Data

US 2004/0034772 A1 Feb. 19, 2004

(51) Int. Cl.
*H04K 1/02* (2006.01)
*H04K 1/04* (2006.01)
*H04K 1/10* (2006.01)

(52) U.S. Cl. .......................... 380/37; 380/42; 380/262; 380/30

(58) Field of Classification Search .................. 380/30, 380/37, 42, 262
See application file for complete search history.

(56) References Cited

U.S. PATENT DOCUMENTS

| 4,405,829 | A | | 9/1983 | Rivest et al. | |
|---|---|---|---|---|---|
| 4,634,807 | A | * | 1/1987 | Chorley et al. | 705/55 |
| 5,142,579 | A | * | 8/1992 | Anderson | 380/30 |
| 5,406,628 | A | | 4/1995 | Beller et al. | |
| 5,625,690 | A | * | 4/1997 | Michel et al. | 705/53 |
| 5,818,934 | A | * | 10/1998 | Cuccia | 380/216 |
| 5,987,131 | A | * | 11/1999 | Clapp | 713/171 |

(Continued)

FOREIGN PATENT DOCUMENTS

WO WO 99/27678 3/1999

OTHER PUBLICATIONS

Stallings, William. "Contemporary Symmetric Ciphers." Cryptography and Network Security. Upper Saddle River, NJ: Prentice Hall, 2003. 179-184.*
Stallings, William. "Contemporary Symmetric Ciphers." Cryptography and Network Security. Upper Saddle River, NJ: Prentice □□Hall, 2003. 179-184.*
International Search Report; PCT/US 02/26115; Mailed Apr. 28, 2003.

*Primary Examiner*—Gilberto Barron, Jr.
*Assistant Examiner*—Venkat Perungavoor
(74) *Attorney, Agent, or Firm*—Meyertons Hood Kivlin Kowert & Goetzel, P.C.; Rory D. Rankin

(57) ABSTRACT

An encrypted private session key for a private-key encryption method is quickly exchanged between a first device and a second device by computing encryption acceleration data using a public key for a public-key encryption method. The encryption acceleration data and the public key are sent to and used on the second device to encrypt a private session key exchanged between the first device and second device. The private-key encryption method is quickly initialized on the second device using encryption initialization data for the private-key encryption method computed on the first device using the exchanged private session key sent to the second device. The encryption acceleration data and encryption initialization data reduce a number of calculations needed on the second device to initialize and use the private-key encryption method, thereby reducing the overall time needed to create a cryptographically secure communications channel between the first device and the second device.

31 Claims, 8 Drawing Sheets

U.S. PATENT DOCUMENTS

| | | |
|---|---|---|
| 6,023,689 A | 2/2000 | Herlin et al. |
| 6,081,597 A | 6/2000 | Hoffstein et al. |
| 6,091,819 A * | 7/2000 | Venkatesan et al. .......... 380/28 |
| 6,125,185 A | 9/2000 | Boesch |
| 6,263,437 B1 | 7/2001 | Liao et al. |
| 6,307,936 B1 | 10/2001 | Ober et al. |
| 6,396,926 B1 | 5/2002 | Takagi et al. |
| 2002/0199119 A1 * | 12/2002 | Dunnion et al. ............ 713/201 |

* cited by examiner

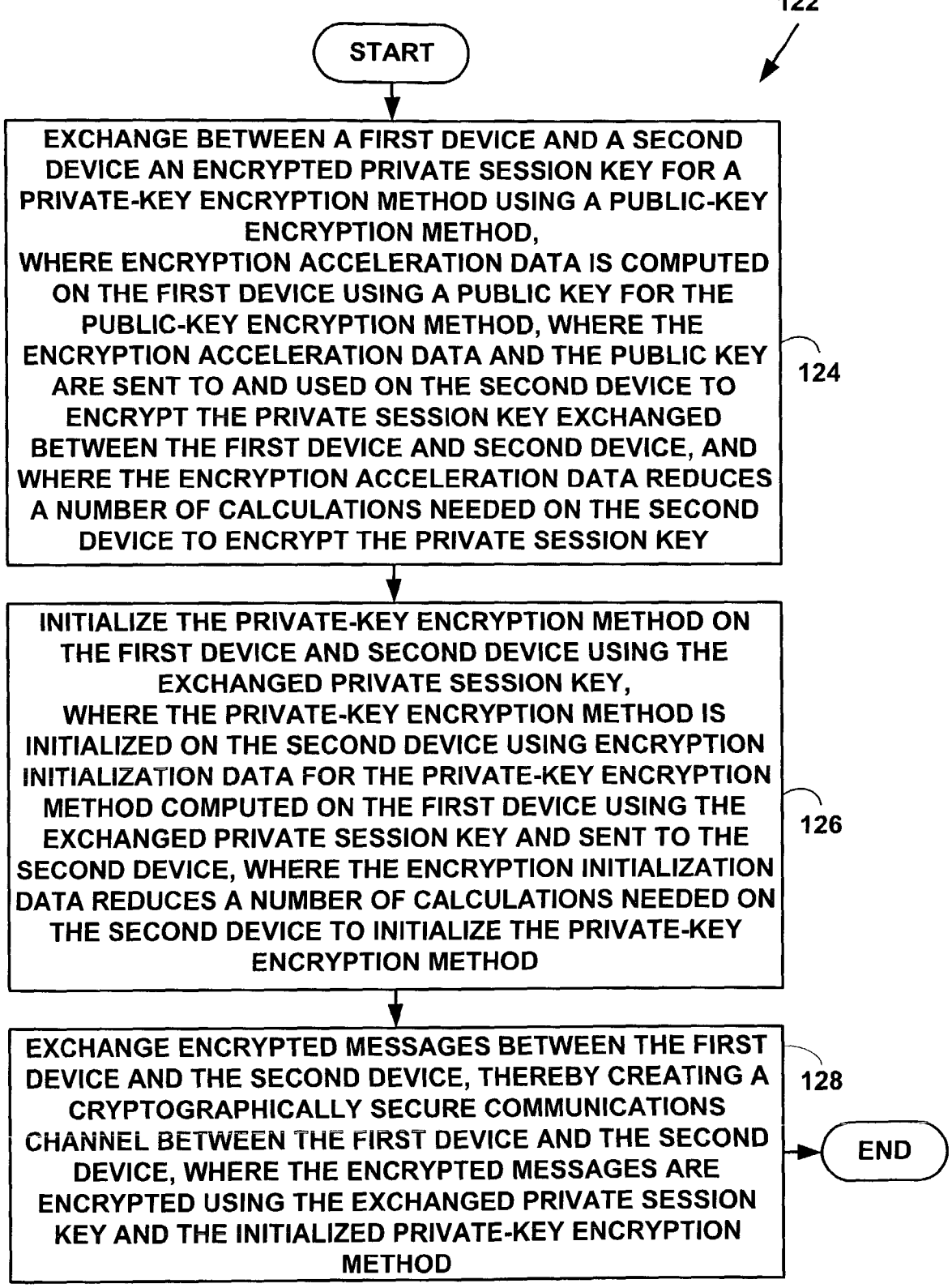

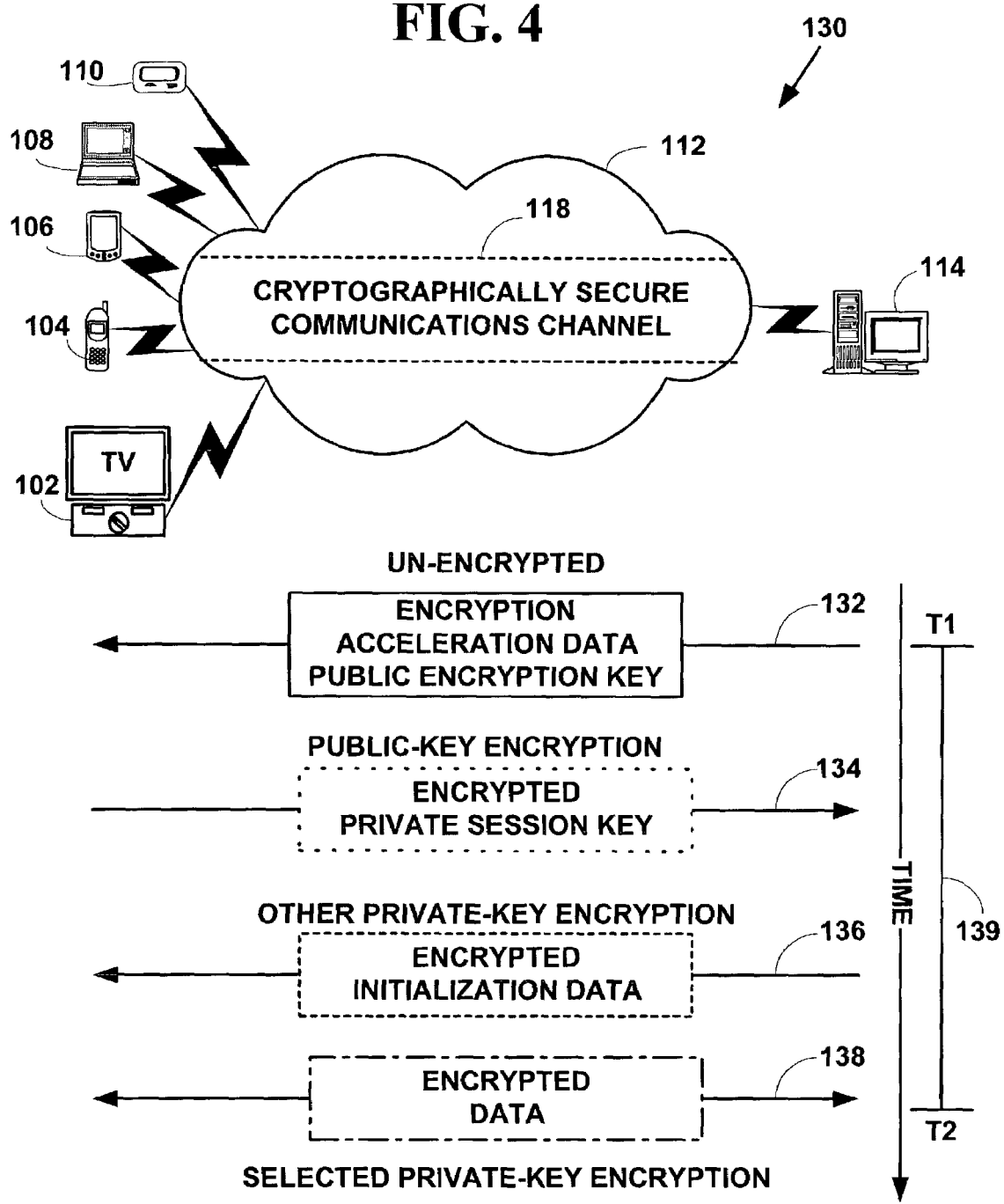

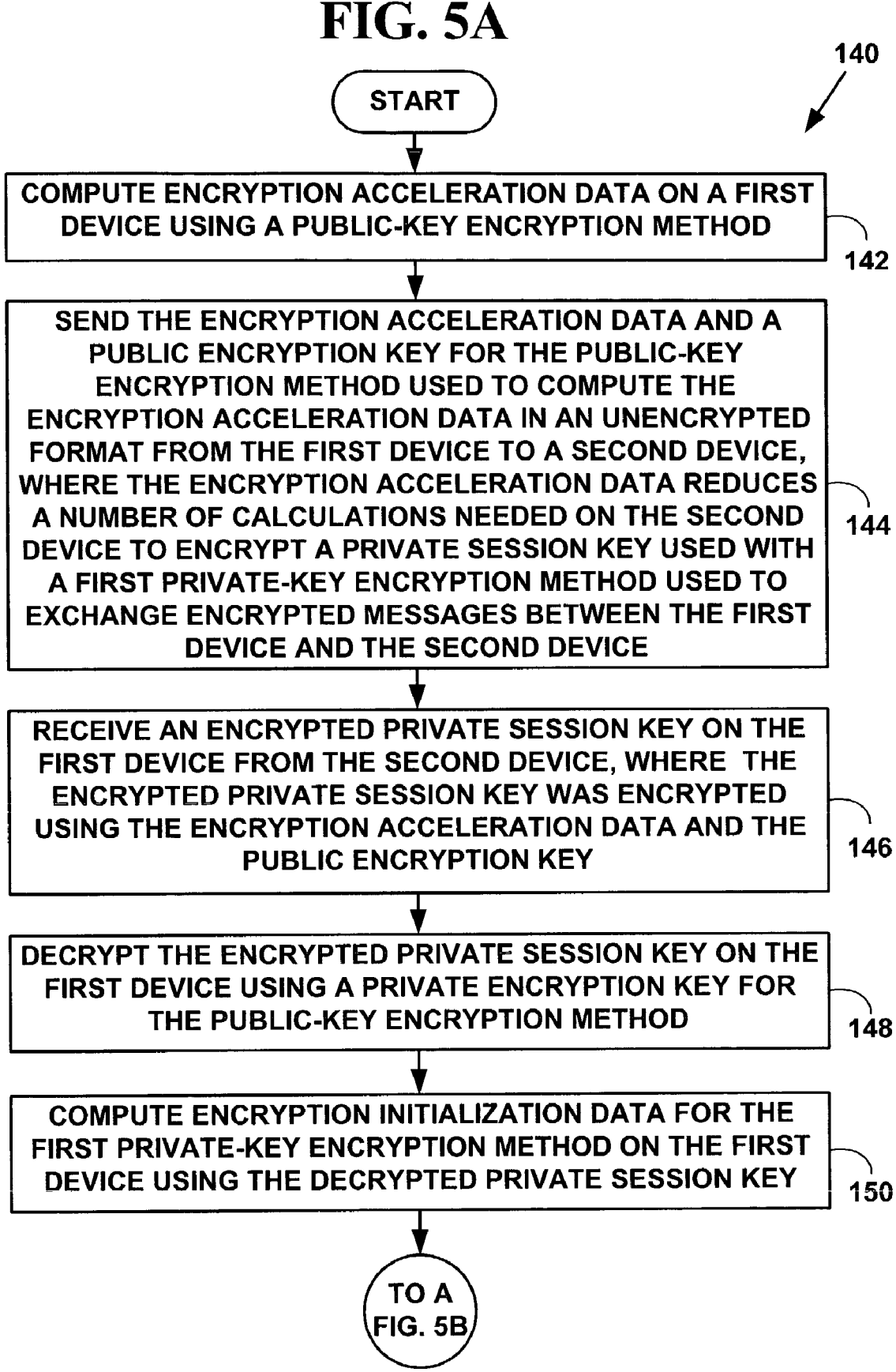

FIG. 5B

↓

ENCRYPT THE COMPUTED ENCRYPTION INITIALIZATION DATA USING A SECOND PRIVATE-KEY ENCRYPTION METHOD AND THE DECRYPTED PRIVATE SESSION KEY — 152

SEND THE ENCRYPTED COMPUTED ENCRYPTION INITIALIZATION DATA FROM THE FIRST DEVICE TO THE SECOND DEVICE, WHERE THE COMPUTED INITIALIZATION DATA IS USED TO INITIALIZE THE FIRST PRIVATE KEY ENCRYPTION METHOD ON THE SECOND DEVICE AND WHERE THE ENCRYPTION INITIALIZATION DATA REDUCES A NUMBER OF CALCULATIONS NEEDED ON THE SECOND DEVICE TO INITIALIZE THE FIRST PRIVATE-KEY ENCRYPTION METHOD — 154

EXCHANGE ENCRYPTED MESSAGES BETWEEN THE FIRST DEVICE AND THE SECOND DEVICE, THEREBY CREATING A CRYPTOGRAPHICALLY SECURE COMMUNICATIONS CHANNEL BETWEEN THE FIRST DEVICE AND THE SECOND DEVICE, WHERE THE ENCRYPTED MESSAGES ARE ENCRYPTED USING THE PRIVATE SESSION KEY AND THE FIRST PRIVATE-KEY ENCRYPTION METHOD INITIALIZED WITH THE ENCRYPTION INITIALIZATION DATA — 156

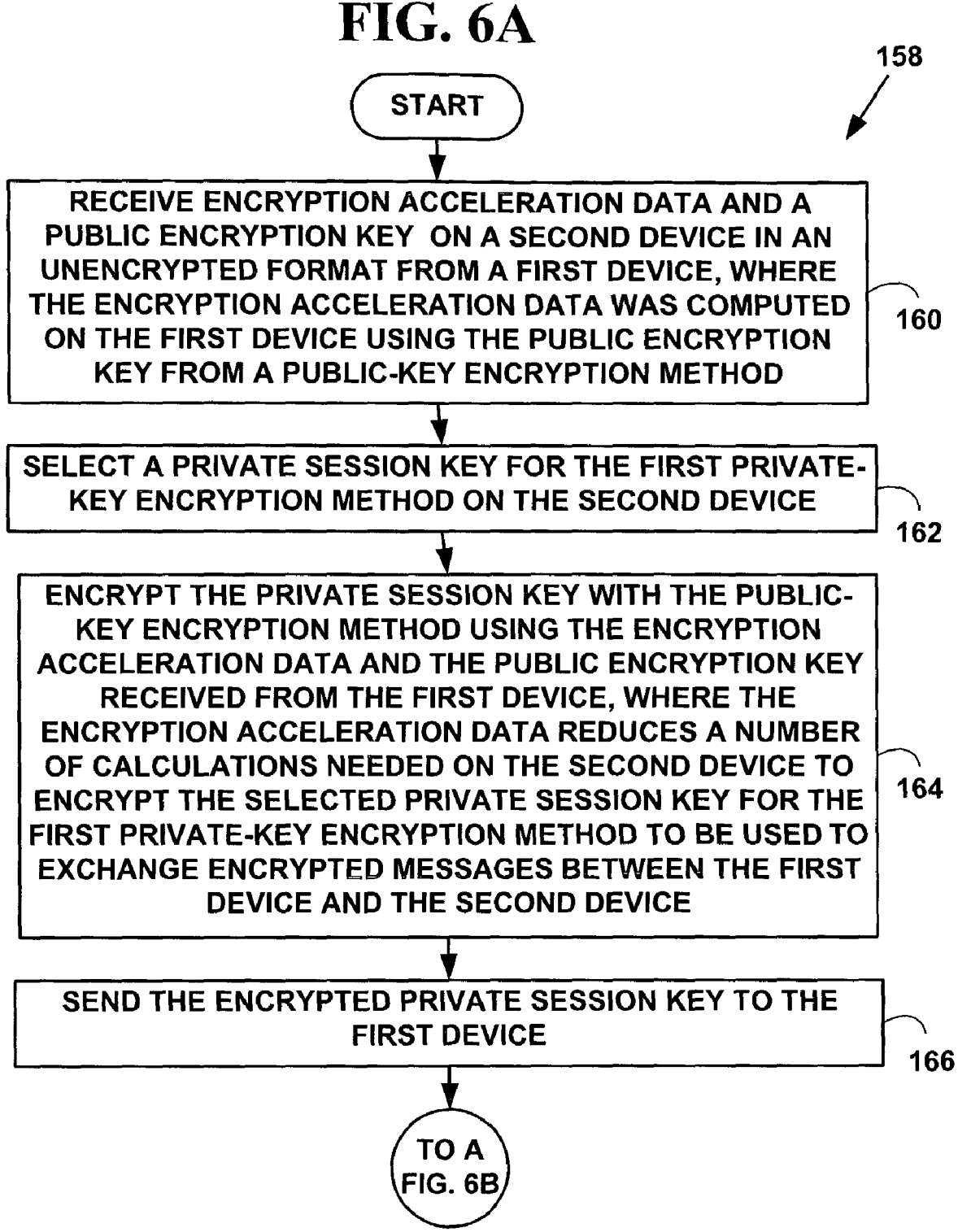

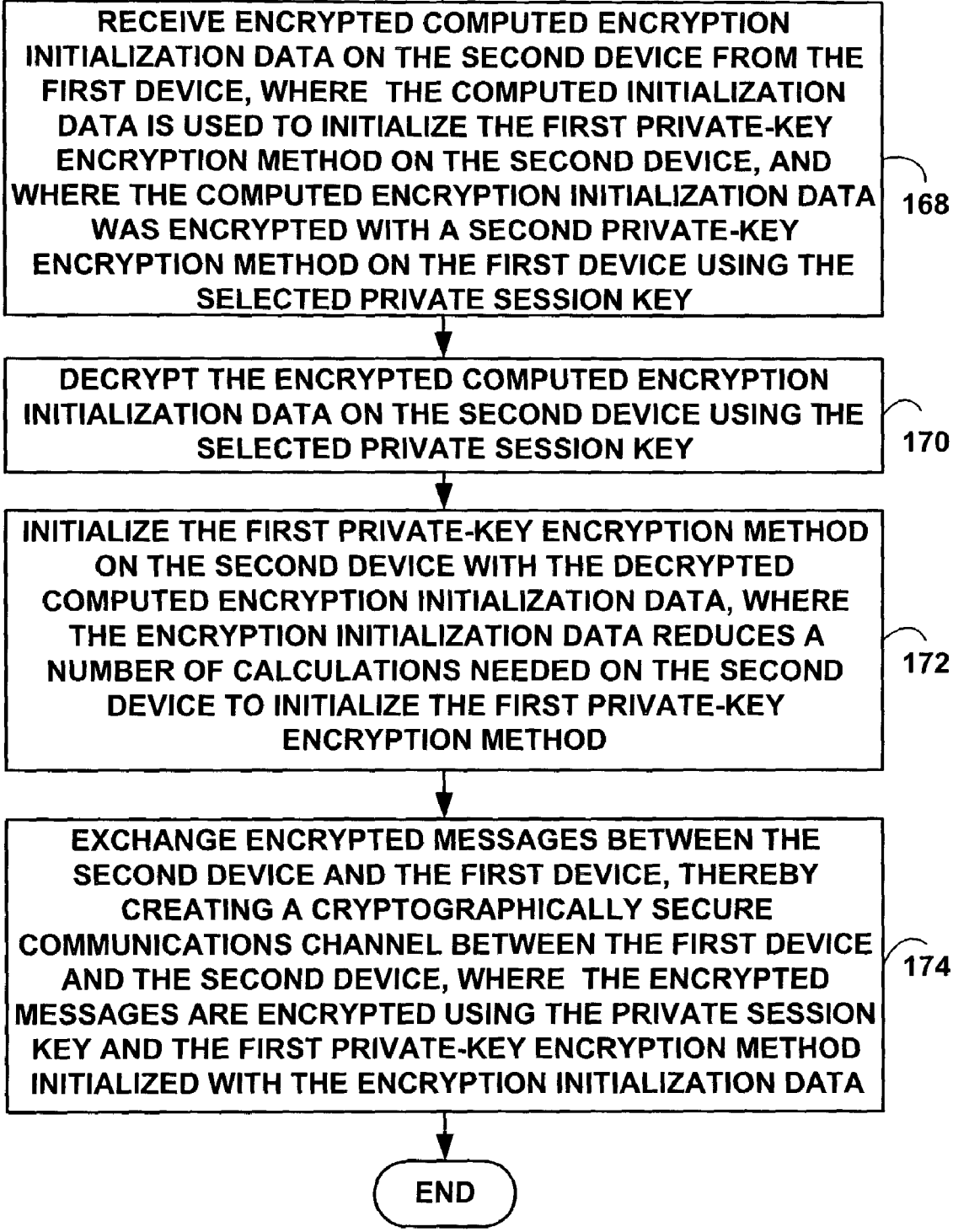

METHOD AND SYSTEM FOR ACCELERATED DATA ENCRYPTION

FIELD OF THE INVENTION

This invention relates encryption and data security. More specifically, it relates to a method and system to accelerate data encryption on devices with limited resources.

BACKGROUND OF THE INVENTION

As is known in the art, "encryption" is the process of transforming information so it is unintelligible to everyone but an intended recipient. "Decryption" is the process of transforming encrypted information so that it is intelligible again. With most cryptographic schemes, the ability to keep encrypted information secret is based not on the cryptographic method, which is widely known, but on a "key" that is used with the method to produce an encrypted result or to decrypt previously encrypted information.

In general, there are two kinds of cryptosystems: "symmetric" and "asymmetric." Symmetric cryptosystems use the same key (e.g., a secret key) to encrypt and decrypt a message. Symmetric cryptosystems are also called "private-key" cryptosystems.

Asymmetric cryptosystems use two keys; one key (e.g., a public key) to encrypt a message and a different key (e.g., a private key) to decrypt it. Asymmetric cryptosystems are also called "public-key" cryptosystems.

Public-key encryption use a pair of keys, a "public key" and a "private key." The key pairs are associated with an entity that needs to authenticate its identity electronically, to sign data with a digital signature, to exchange data securely, to encrypt data, etc. A public key is publicly published and is used by others to send encrypted data. However, a corresponding private key is kept secret. Data encrypted with a public key is decrypted with a corresponding private key.

The well known RSA encryption method is one example of a public-key encryption method. The RSA acronym stands for Rivest, Shamir, and Adelman, the inventors of the encryption method. For more information on RSA, see U.S. Pat. No. 4,405,829. RSA has been incorporated into many security products including the Secure Socket Layer ("SSL"), Secure Shell ("SSH") as well as numerous security products used to send and receive data over public networks such as the Internet.

A "cipher" is a cryptographic method used to encrypt data and transform plaintext into cipher text using a predefined key. A "stream cipher" is an encryption technique that serially encrypts a stream of data, one-bit at a time. A stream cipher generates a "key stream" and encryption is provided by combining the key stream with the plaintext, usually with a bitwise exclusive-or operation. The generation of the key stream can be independent of the plaintext and cipher text (yielding a synchronous stream cipher) or it can depend on the data and its encryption (in which case the stream cipher is said to be "self-synchronizing"). Most stream cipher designs are for synchronous stream ciphers.

A "block cipher" encrypts data in discrete units called blocks, rather than as a continuous stream of bits. A common block size for block ciphers is 64 bits. For example, the well known Data Encryption Standard ("DES") is a block cipher. DES encrypts data in 64-bit blocks. DES is a symmetric or private-key encryption method that uses the same method and the same key for encryption and decryption.

Although RSA can be used for creating cryptographically secure communication channels, RSA turns out to be much slower than other encryption methods such DES. Thus, RSA is typically used for exchanging cryptographic keys in order to authenticate parties involved in secure transactions. RSA is often used in combination with DES and other such encryption methods to create cryptographically secure communications channels.

It has become common for two devices, such as client and server computers to establish a cryptographically secure communications channel to exchange data taking into account the privacy and security of the data sent over the communications channel.

The secure communications channel is typically established using some type of cryptography and exchanging cryptographic keys using messages. The cryptographically secure communications channel may be used for electronic commerce ("e-commerce"), to exchange financial information, subscription information, normal data exchange, etc. In many instances, a cryptographically secure communications channel may be established with client devices with limited resources.

In virtually all public-key encryption systems including RSA, encryption and decryption times are very lengthy compared to other block-oriented methods such as DES for equivalent data sizes. Therefore in most implementations of cryptographically secure communications channels, a temporary, random "private session key" is often generated for messages sent over the cryptographically secure communications channel. The private session key is typically encrypted by a public key from a public-key encryption method such as RSA. At the receiver side, the private session key is decrypted using a private key for the public-key encryption method and the recovered private session key is then used to encrypt/decrypt messages via a private-key encryption method. The actual messages sent over the created cryptographically secure communications channel are encrypted using a faster private-key encryption method (e.g., block cipher) using the private session key as the encryption key.

There are a number of problems associated with using a public-key encryption method to exchange a private session key for a private-key encryption method. One problem is that public-key encryption methods require substantial amounts of computational resources and computational time. For example, completing RSA encryption with a 512-bit key may require a minute or more of computation time if the RSA encryption is implemented in software. Such RSA encryption may be difficult, slow or virtually impossible to complete on a thin-client device such as a set-top box, mobile phone or PDA, etc. If the cryptographically secure channel is being used for e-commerce or some other type of transaction that requires a virtually instantaneous response, such long public-key encryption times are not acceptable.

Another problem is that the initialization of efficient private key block ciphers also takes substantial amounts of computational resources and computational time. It may take dozens of seconds to initialize a private-key block cipher if tile private-key block cipher is implemented in software. This is significant on thin-client devices and may not be acceptable for transactions that require a virtually instantaneous response.

Another problem is that the private session key may be generated with a stream cipher. Stream ciphers usually need more processor cycles per byte of data than block cipher methods resulting in lower encryption throughput.

There have been attempts to overcome some of the problems associated with creating cryptographically secure communications channels. The following U.S. Patents and others have attempted to overcome some of these problems.

U.S. Pat. No. 5,406,628 to Beller, et al. was issued for "Public key authentication and key agreement for low-cost terminals." This patent relates to a method for achieving mutual authentication and session key agreement between a pair of parties using public-key cryptography. The patent describes a system wherein one of the parties is computationally weak (i.e., has a minimum of computational capability), and one of the parties is computationally strong, (i.e., has a much larger computational capability). Authentication and session key agreement is achieved between two parties without the exchange of any permanent secrets through the use of only three (and in some cases only one) real-time large modular multiplications performed at the computationally weak party.

U.S. Pat. No. 6,125,185 to Boesch was issued for a "System and method for encryption key generation." This patent relates to a method to balance or level processor computational load during the generation of random symmetric DES type keys and RSA type public key encryption, whereby the DES type keys are pre-generated and pre-encrypted for known and expected receivers, and stored for immediate access during time-critical on-line communication between the sender and receiver. A method for authentication using the sender's RSA public key is also disclosed whereby the sender's authenticating signature is pre-generated and stored with the pre-generated and pre-encrypted DES keys.

U.S. Pat. No. 6,263,437 to Liao, et al. was issued for "Method and apparatus for conducting crypto-ignition processes between thin client devices and server devices over data networks." This patent relates to a crypto-ignition process to establish an encrypted communication protocol between two devices connected by an insecure communication link. This patent includes a method of creating an identical secret key for two communicating parties including a thin device and a server computer over an insecure data network. The thin device generally has limited computing power and working memory. To ensure the security of the secret key on both sides and reduce traffic in the network, only a pair of public values is exchanged between the thin device and the server computer over the data network. Each side generates its own secret key from a self-generated private value along with the received counterpart's public value according to a commonly used key agreement protocol.

However, these inventions still do not solve all of the problems associated with establishing a cryptographically secure communications channel. It is desirable to use a public-key encryption method to exchange a private session key for a private-key encryption method as quickly and as efficiently as possible between two devices, especially where one of the devices has fewer resources than the other device.

SUMMARY OF THE INVENTION

In accordance with preferred embodiments of the present invention, some of the problems associated with creating cryptographically secure communications channels are overcome. A method and system to accelerate data encryption is presented.

An encrypted private session key for a private-key encryption method is quickly exchanged between a first device and a second device by computing encryption acceleration data using a public key for a public-key encryption method. The encryption acceleration data and the public key are sent to and used on the second device to encrypt the private session key exchanged between the first device and second device. The encryption acceleration data reduces a number of calculations needed on the second device to encrypt the private session key. The second device may have fewer resources than the first device.

The private-key encryption method is quickly initialized on the second device using encryption initialization data for the private-key encryption method computed on the first device using the exchanged private session key and sent to the second device. The encryption initialization data reduces a number of calculations needed on the second device to initialize the private-key encryption method.

The method and system may reduce the overall time needed to create a cryptographically secure communications channel between the first device and the second device. The method and system may thus accelerate data encryption between two devices.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a flow diagram illustrating a method for accelerating data encryption;

FIG. 4 is a data flow diagram illustrating an exemplary data flow for the method of FIG. 3;

FIGS. 5A and 5B are a flow diagram illustrating a method for accelerating data encryption from a first device; and FIGS. 6A and 6B are a flow diagram illustrating a method for accelerating data encryption on a second device.

DETAILED DESCRIPTION OF PREFERRED EMBODIMENTS

Exemplary Encryption System

Figure 1:
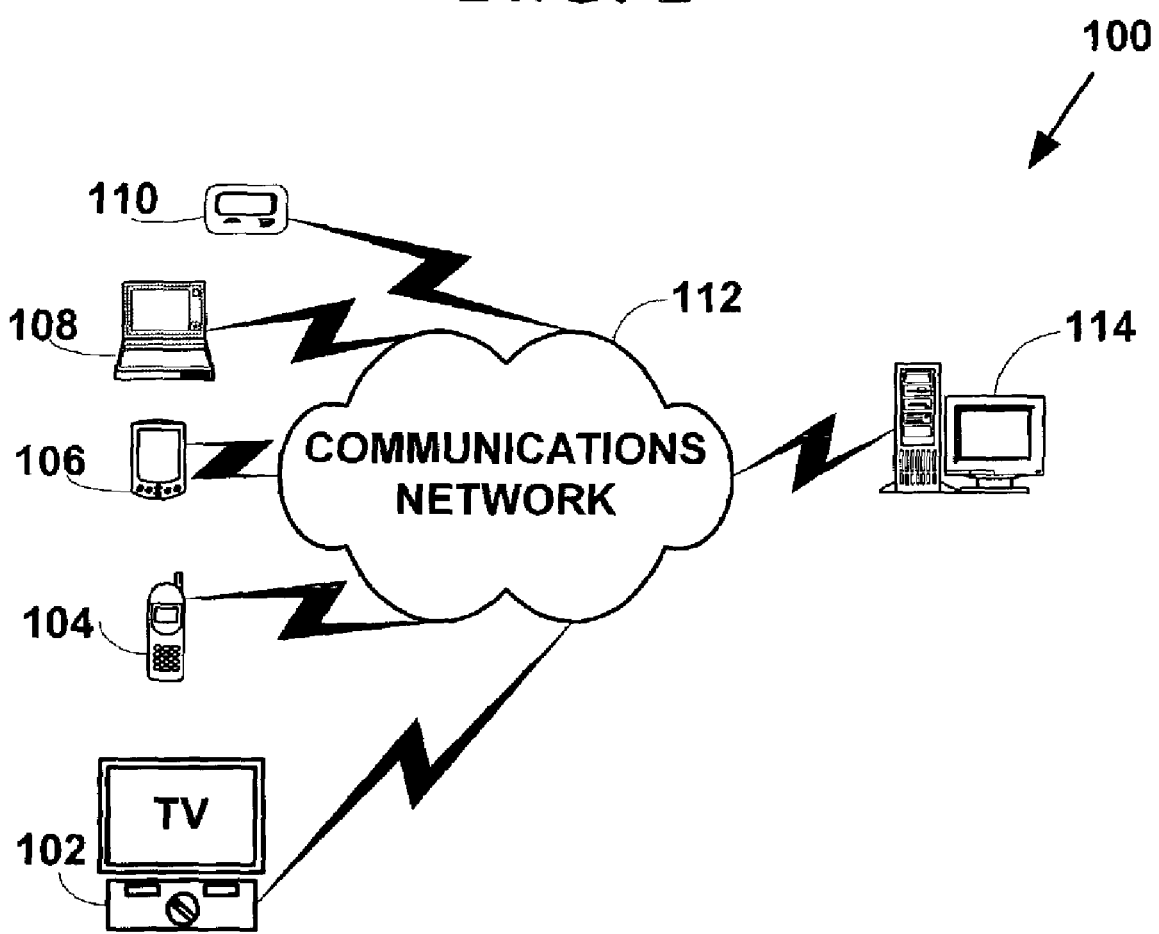
FIG. 1 is a block diagram illustrating an encryption system.

FIG. 1 is a block diagram illustrating an encryption system 100. The encryption system 100 includes one or more client devices 102, 104, 106, 108, 110, in communications via a communications network 112 with a server device 114. However, the present invention is not limited to those components, and more, fewer or other components can also be used to practice the invention.

The one or more client devices 102–110 include, but are not limited to, set-top boxes 102, mobile phones 104, personal digital/data assistants ("PDAs") 106, computers 108, two-way pagers 110, and other types of client devices (e.g., Internet appliances, cable modems, etc.). The one or more client devices 102–110 may include "thin-client" devices.

Thin-client devices typically include devices with small physical size, light weights, limited device resources, and corresponding small display screen sizes, if they have any screens at all. These thin-client devices have a number of constraints including limited processing power, limited memory, limited battery life, a limited user interface if any, etc.

A thin-client typically performs limited application processing, or none at all. Thin-clients typically rely on a "fat" server to perform application processing such as encryption. However, the present invention is not limited to "thin-client" devices. The one or more client devices may also include "fat-client" devices, such as desktop computers (not illustrated), laptop computers 108 or other computing devices and computing devices capable of performing all or most of the application processing, and may have as many device resources as the server device 114.

The communications network 112 includes, but is not limited to, local area networks ("LAN"), the public switched telephone network ("PSTN"), wireless networks, cable television ("CATV") networks, fiber-optic networks, the Internet, intranets, other wired networks and other types of communications networks.

The server device 114 includes, but is not limited to, server computers, application servers, web servers, network servers, gateways, routers, CATV head-end servers, cable modem termination systems, and other types of server devices. A server device 114 is typically a host computer on a network. A server typically includes information, data, applications and responds to requests from plural clients.

An operating environment for the devices of the encryption system 100 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals or biological signals by the CPU or processor. An electrical system or biological system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Cryptographically Secure Connections

Figure 2:
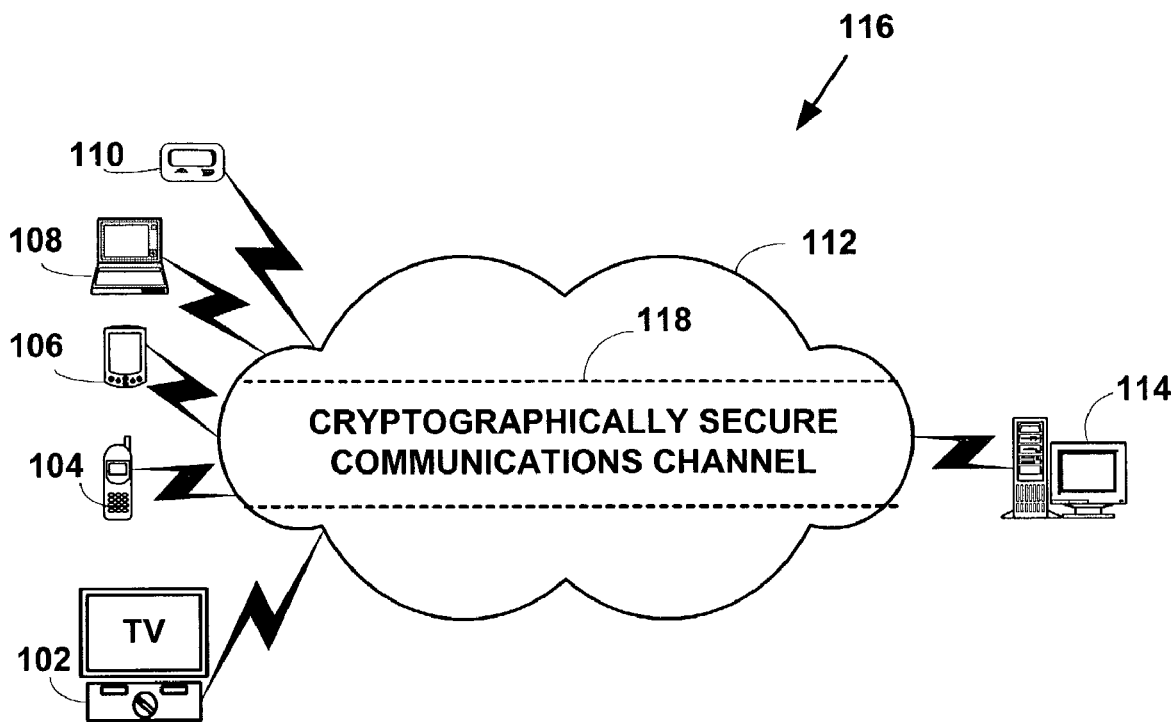
FIG. 2 is a flow diagram illustrating a cryptographically secure connection between two devices.

FIG. 2 is a block diagram 116 illustrating a cryptographically secure connection between two devices. One or more client devices (e.g., 102–110) establishes a cryptographically secure communications channel 118 to a server device 114 over an un-secure communications network 112. A server device 114 may also establish a cryptographically secure communications channel 118 to one or more client devices 102-110. The cryptographically secure communications channel 118 may also be established through intermediate devices (not illustrated) such as intermediate gateways, routers, etc.

The cryptographically secure communications channel 118 is created by encrypting data packets exchanged between the client devices 102–110 and the server device 114 with a desired private-key encryption method. It is desirable to establish the cryptographically secure communications channel as quickly and efficiently as possible between the client devices 102–110 and the server device 114.

Accelerating Data Encryption

FIG. 3 is a flow diagram illustrating a Method 122 for accelerating data encryption. At Step 124, an encrypted private session key for a selected private-key encryption method is quickly exchanged between a first device and a second device via a communications network using a public-key encryption method. The encrypted private session key is exchanged by computing encryption acceleration data on the first device using a public key for the public-key encryption method. The encryption acceleration data and the public key are sent to and used on the second device to quickly encrypt the private session key exchanged between the first device and second device. The encryption acceleration data reduces a number of calculations needed on the second device to encrypt the private session key.

At Step 126, the private-key encryption method is quickly initialized on the second device using the exchanged private session key. The private-key encryption method is initialized on the second device using encryption initialization data for the private-key encryption method computed on the first device using the exchanged private session key and sent to the second device. The encryption initialization data may also be used on the first device to initialize the private-key encryption method. The encryption initialization data also reduces a number of calculations needed on the second device to initialize the selected private-key encryption method.

At Step 128, encrypted messages are exchanged between the first device and the second device, thereby creating a cryptographically secure communications channel between the first device and the second device. The encrypted messages are encrypted using the exchanged private session key and the initialized private-key encryption method.

Method 122 is illustrated with an exemplary embodiment including specific components. However, the present invention is not limited to this embodiment or the components described and other embodiments and components can also be used to practice the invention.

In such an exemplary embodiment, RSA encryption is used as a public-key encryption method, and the Blowfish block cipher is used as a private-key encryption method. However, the present invention is not limited to RSA and Blowfish, and virtually any public-key encryption method and private-key encryption method can be used with Method 122 to practice the invention.

In such an exemplary embodiment using RSA and Blowfish at Step 124, an encrypted private session key for the Blowfish block cipher private-key encryption method is quickly exchanged between a first device (e.g. server device 114) and a second device (e.g., client device 102–110) using the RSA public-key encryption method via the communications network 112.

The RSA public-key encryption method is based on the premise that there is no efficient way to factor very large numbers. The RSA encryption function is defined $C=T^E$ mod PQ, where "P" and "Q" are two large prime numbers, "C" is encrypted cipher text (e.g., a positive integer), "T" is the plaintext (e.g., a positive integer), "E" is an exponent, "D" the multiplicative inverse of E, and "mod" is the modulus arithmetic operation whose result is the remainder of a division operation (e.g., 17 mod 4=1 because 17 divided by 4 yields a remainder of 1). The RSA "public key" is the pair (PQ, E). The RSA "private key" is the number D. The product PQ is the "modulus." E is the "public exponent." D is the "secret exponent." For more information on RSA encryption, see U.S. Pat. No. 4,405,829, incorporated by reference. (See also, Table 1 below).

Blowfish is a block cipher that includes a network of Feistel ciphers, iterating an encryption function at least 16 times. The Blowfish block size is 64-bits and the private session key can be any length up to 448-bits. As is known in the art, the Feistel cipher was developed by Horst Feistel at the IBM Thomas J. Watson Research Labs. The Fesitel cipher partitions two input blocks of a block cipher into two halves, L(i−1) and R(i−1) and uses only R(i−1) in the $i^{th}$ part of the cipher. Feistel ciphers can be described functionally as L(i)=R(i−1) and R(i)=L(i−1) XOR g(K(i), R(i−1)), where "XOR" is a eXclusive OR operation, "g" is an encryption function and "K" is a key value. Blowfish has complex initialization phase that needs to be completed before encryption can take place. However, after initialization actual encryption of data is very efficient. For more information on Blowfish, see "Description of New Variable-Length Key, 64-Bit Block Cipher (Blowfish)," by B. Schneier, *Fast Software Encryption, Cambridge Security Workshop Proceedings* (December 1993), Springer-Verlag, 1994, pp. 191–204, incorporated herein by reference.

The encrypted private session key is exchanged using RSA encryption acceleration data on the first device 114 using a public key for RSA. The RSA encryption acceleration data is computed to speed up RSA encryption of the private session key for the Blowfish block cipher that will be exchanged between the first device 114 and second device 102–110.

For example, one of the most common operations performed in public-key encryption methods such as RSA is modular exponentiation (i.e., the operation $x^{exp}$ mod n, where x is a base, exp is an exponent and n is a moduli). Performing such an exponentiation with T-bit public key operands is extremely computationally intensive.

In one embodiment of the present invention, the RSA acceleration data corresponds to precomputed variables used for modular expansion used during RSA encryption of the private session key. However, the present invention is not limited to this specific type of RSA encryption acceleration and other types of RSA acceleration data and other public-key encryption acceleration data can also be calculated.

The RSA encryption acceleration data and the RSA public key are sent to the second device 102–110 in an unencrypted message. The RSA public key is already publicly known information and the RSA encryption acceleration data is calculated using the RSA public key. In another embodiment of the present invention, the RSA encryption acceleration data can also be send in an encrypted format.

The RSA acceleration data and RSA public key are used on the second device 102–110 to encrypt with RSA encryption the private session key for the Blowfish block cipher exchanged between the first device 114 and the second device 102–110. The RSA encryption acceleration data reduces a number of calculations needed on the second device 102–110 to encrypt the private session key since the RSA encryption acceleration data is calculated based on input data needed to encrypt the private session key on the second device 102–110 using RSA. This helps speed up the private session key exchange between the first device 114 and the second device 102–110, especially when the first device 114 is a server device and the second device 102–110 is a thin-client device or other device with fewer resources than the first device 114.

At Step 126, the Blowfish block cipher method is quickly initialized on the first device 114 and second device 102–110 using the exchanged private session key. The Blowfish block cipher method is initialized on the second device 102–110 using Blowfish encryption initialization data computed on the first device 114 using the exchanged private session key and sent to the second device 102–110.

For example, the first device 114 computes Blowfish block cipher S-boxes and P-arrays using the exchanged Blowfish private session key. However, the present invention is not limited to computing S-box and P-array initialization data, and other types of private-key encryption method initialization data can also used. As is known in the art, Blowfish block ciphers include S-P networks, wherein "S" comprises Substitutions and "P" comprises Permutations.

In a Substitution operation, a binary word of n-bits is replaced by some other binary word of n-bits. The whole substitution function forms a Substitution "subkey." The Substitution operation can be characterized as a large lookup table with n-address lines inputs and $2^n$ address outputs. The Substitution operation is referred to as an "S-box."

In a Permutation operation, a binary word of n-bits is reordered or "permuted." The re-ordering forms a Permutation "subkey." The Permutation operation can be characterized as a "cross-wiring" with an n-bit input and an n-bit output. The Permutation operation is referred to as a "P-array." Sets of S-boxes are typically linked by a P-array.

The Blowfish encryption initialization data reduces a number of calculations needed on the second device to initialize the Blowfish block cipher. For example, if the Blowfish Block Cipher is used as the private-key encryption method, a large number of P-array and S-box subkeys must be computed before any data encryption or decryption can be completed. A Blowfish P-array typically comprises eighteen 32-bit subkeys that need to be initialized. Blowfish also uses at least four 32-bit S-boxes with 256 entries each, or four very large S-box subkeys that need to be initialized. The S-boxes and P-arrays are initialized on the first device and sent to the second device in an encrypted format using the exchanged private session key to encrypt the data with another private-key encryption method (e.g., a pseudo one-time pad, etc.). Thus, the second device does not have to perform the large number of calculations typically required to initialize the Blowfish block cipher encryption method.

For example, a "pseudo one-time pad" can be used with the exchanged private session key to encrypt the Blowfish encryption initialization data.

As is known in the art, a "one-time pad," sometimes called the Vernam cipher, uses a string of bits that are generated at random. The random bits are combined using with plaintext to be encrypted using bit-wise eXclusive-OR ("XOR") operations to produce cipher text based on a selected key. One-time pads are used in pairs. One copy of the pad is kept by each user, and pads must be exchanged via a secure channel (e.g., via RSA encryption, hand-delivery, etc.). Once the message is encoded with the pad, the pad is destroyed and the encoded message is sent. On the recipient's side, the encoded message is XORed with the duplicate copy of the pad and the plaintext message is generated.

A pseudo one-time-pad is identical to a one-time pad except that the pseudo one-time pad is generated from the session key using a pseudo random number generator. The pseudo one-time pad generation sequence is fast enough so that the decryption time of the session initialization data is minimized. The pseudo one-time-pad is also quite robust to cryptanalytic attacks because the data encrypted with it (e.g., P arrays, S boxes) are random by design.

However, the present invention is not limited to pseudo one-time pads, and other encryption methods can also be used to encrypt the Blowfish encryption data.

At Step 128, encrypted messages are exchanged between the first device 114 and the second device 102–110, thereby creating a cryptographically secure communications channel 118 between the first device 114 and the second device 102–110. The encrypted messages are encrypted using the exchanged Blowfish private session key and the initialized Blowfish block cipher private-key encryption method.

Method 122 was illustrated using RSA as a public-key encryption method and the Blowfish block cipher as a private-key encryption method. However, the present invention is not limited to RSA and Blowfish, and virtually any public-key encryption method, any type of public-key encryption acceleration data, and any private key encryption method or any type of private-key encryption initialization data can be used to practice the invention.

Accelerating Data Encryption Data Flow

FIG. 4 is a data flow diagram illustrating an exemplary data flow 130 for Method 120. A client device 102–110 or the server device 114 desires to create a cryptographically secure channel 118 to a server device 114 via the communications network 112. Either the client device or the server device may initiate the data flow 130 with an encryption initialization message or message sequence (not illustrated in FIG. 4). FIG. 4 is illustrated from the perspective of the server device 114.

The server device 114 sends a first unencrypted message 132 to the client device including encryption acceleration data and a public key for the public encryption method (e.g., RSA) being used to encrypt a private session key for the selected private-key encryption method (e.g., Blowfish block cipher). The client device 102–110 responds with a second encrypted message 134 including a selected private session key for the selected private-key encryption method. The second message 134 was encrypted with the public-key encryption method (e.g., RSA) using the encryption acceleration data and the public key. The server device 114 sends a third encrypted message 136 including encryption initialization data for the selected private-key encryption method. The third encrypted message 136 is encrypted using another agreed upon private-key encryption method, different from the selected private-key encryption method (e.g., a pseudo one-time pad, etc). The client device 102–110 uses the encryption initialization data to initialize an encryption engine for the selected private-key encryption method. The client device 102–110 sends a fourth encrypted message 138 to the server device 114. The fourth encrypted message 138 was encrypted using the selected private-key encryption method (e.g., Blowfish block-cipher). The fourth encrypted message 138 is a first of plural encrypted messages sent between the first device and second device via the cryptographic secure communications channel 118 created as a result of the data flow 130.

The encryption acceleration data and the encryption initialization data reduces a number of calculations needed on the second device to initialize the selected private-key encryption method and thus reduces the overall time required to complete the message sequence between time T1 and T2 139 as is illustrated via data flow 130 (FIG. 4). This also helps reduce the overall time needed to create the cryptographically secure communications channel 118 between the first device 114 and the second device 102–110.

Accelerating Data Encryption from a First Device

FIGS. 5A and 5B are a flow diagram illustrating a Method 140 for accelerating data encryption from a first device. In FIG. 5A at Step 142, encryption acceleration data is computed on a first device using a public-key encryption method. At Step 144, the encryption acceleration data and a public encryption key for the public-key encryption method used to compute the encryption acceleration data are sent in an unencrypted format from the first device to a second device via a communications network. The encryption acceleration data reduces a number of calculations needed on the second device to encrypt a private session key used with a first private-key encryption method used to exchange encrypted messages between the first device and the second device. At Step 146, an encrypted private session key is received on the first device from the second device. The encrypted private session key was encrypted using the encryption acceleration data and the public encryption key. The private session key will be used to encrypt data for the first private-key encryption method. At Step 148, the encrypted private session key is decrypted on the first device using a private encryption key for the public-key encryption method. At Step 150, encryption initialization data for the first private-key encryption method is computed on the first device using the decrypted private session key.

In FIG. 5B at Step 152, the computed encryption initialization data is encrypted using a second private-key encryption method and the decrypted private session key. At Step 154, the encrypted computed initialization data is sent from the first device to the second device. The computed initialization data is used to initialize the first private key encryption method on the second device. The encryption initialization data reduces a number of calculations needed on the second device to initialize the first private-key encryption method. At Step 156, encrypted messages are exchanged between the first device and the second device, thereby creating a cryptographically secure communications channel between the first device and the second device. The encrypted messages are encrypted using the private session key and the first private-key encryption method initialized with the encryption initialization data.

Method 140 is illustrated with an exemplary embodiment including specific components. However, the present invention is not limited to this embodiment or components and other embodiments and components can also be used to practice the invention.

Method 140 is illustrated using RSA as a public-key encryption method and the Blowfish block cipher as a selected private-key encryption method. However, the present invention is not limited to RSA and Blowfish, and virtually any public-key encryption method, any type of public-key encryption acceleration data, and any private key encryption method or any type of private-key encryption initialization data can be used to practice the invention.

In such an exemplary embodiment at Step 142, RSA acceleration data is computed on a first device using a RSA public key. In one embodiment of the present invention, the second device 102–110 is a thin-client device and the first device is a server device 114 with more device resources than the thin-client device. However, the present invention is not limited to this embodiment and other types of devices can also be used. In another embodiment, the second device 102–110 can include as many device resources as the first device 114.

Table 1 illustrates exemplary encryption RSA acceleration data computed using the RSA public key encryption method. However, the present invention is not limited to the RSA acceleration data illustrated in Table 1 and other types of RSA acceleration data can also be used to practice the invention.

TABLE 1

1. Compute a T-bit RSA public/private key pair a. Select 2 large prime numbers p and q on the first device 114.
   Let n = p * q
b. Select an integer e such that the greatest common denominator
   ("gcd") gcd(e, (p − 1)(q − 1)) = 1.
   For example, e = 3 works in virtually all instances and helps
   significantly reduces encryption time on the second device 102–110.
c. Compute d, such that e*d = 1 mod ((p− 1)(q − 1)).
d. RSA public key = (e,n) and RSA private key = (d, n).
2. Compute RSA acceleration data a. Define r = $2^{T-bit}$ gcd(r, n) = 1, since n is odd by construction.
b. Define n and r' such that (r * r') − (n*n') = 1. r' and
   n' can be computed using the Extended Euclidean method.
c. Let x' = 1 * r mod n and x" = x' * r * x' * r * r mod n.
d. RSA acceleration data = (r, n', x', x") and corresponds to the pre-
   computed data the second device 102–110 uses to encrypt the private
   session key. For example, the RSA acceleration data corresponds to
   variables the second device 102–110 will need to encrypt the private
   session key using fast Montgomery modular expansion to complete
   modular exponentiation for RSA encryption.

At Step 144, the RSA acceleration data (e.g., Table 1) and the RSA public encryption key (e.g., Table 1) used to generate the RSA acceleration data are sent in an unencrypted format from the first device 114 to a second device 102–110 via the communications network 112. The RSA acceleration data reduces a number of calculations needed on the second device 102–110 to encrypt a Blowfish block cipher private session key exchanged between the first device 114 and the second device 102–110, resulting in a significantly quicker response from the second device 102–110.

At Step 146, an encrypted Blowfish block cipher private session key is received on the first device 114 from the second device 102–110. The encrypted private session key was RSA encrypted using the RSA acceleration data and the RSA public encryption key.

At Step 148, the encrypted private session key is decrypted on the first device 114 using a private encryption key for RSA. At Step 150, encryption initialization data for the Blowfish block cipher is computed on the first device 114 using the decrypted private session key. In one embodiment of the present invention, Step 150 includes computing Blowfish S-boxes and P-arrays as was describe above.

In FIG. 5B at Step 152, the computed encryption initialization data is encrypted using the decrypted private session key and a second private-key encryption method. In one embodiment of the present invention, the computed Blowfish S-boxes and P-arrays are encrypted using a pseudo one-time pad, etc. encryption method and the decrypted session key.

At Step 154, the encrypted computed Blowfish initialization data is sent from the first device 114 to the second device 102–110. The computed Blowfish initialization data is used to initialize the first private key encryption method on the second device 102–110 as well as on the first device 114. The encryption initialization data also reduces a number of calculations needed on the second device 102–110 to initialize the Blowfish block-cipher private-key encryption method.

At Step 156, encrypted messages are exchanged between the first device 114 and the second device 102–110, thereby creating a cryptographically secure communications channel 118 between the first device 114 and the second device 102–110. The encrypted messages are encrypted using the Blowfish private session key and the Blowfish block cipher initialized with the Blowfish initialization data.

Method 140 helps reduce encryption initialization time between the first device 114 and second device 102–110 via the first device 114 by computing data on the first device 114 (e.g., a fat-server device) that can be used on the second device 102–110, thereby reducing the number of computations necessary on the second device 102–110 (e.g., a thin-client device or other client device with fewer resources than the server device). It also helps reduce the overall time needed to create the cryptographically secure communications channel 118 between the first device 114 and the second device 102–110.

Accelerating Data Encryption on a Second Device

FIGS. 6A and 6B are a flow diagram illustrating a Method 158 for accelerating data encryption on a second device. In FIG. 6A at Step 160, encryption acceleration data and a public encryption key is received on a second device in an unencrypted format from a first device via a communications network. The encryption acceleration data was computed on the first device using the public encryption key from a public-key encryption method. At Step 162, a private session key is selected for the first private-key encryption method on the second device. At Step 164, the private session key is encrypted with the public-key encryption method using the encryption acceleration data and the public encryption key received from the first device. The encryption acceleration data reduces a number of calculations needed on the second device to encrypt the selected private session key for the first private-key encryption method to be used to exchange encrypted messages between the first device and the second device. At Step 166, the encrypted private session key is sent to the fist device. At Step 168, encrypted computed initialization data is received on the second device from the first device. The computed initialization data is used to initialize the first private-key encryption method on the second device, and wherein the computed initialization data was encrypted with a second private-key encryption method on the first device using the selected private session key.

In FIG. 6B at Step 170, the encrypted computed initialization data is decrypted on the second device using the selected private session key. At Step 172, the first private-key encryption method is initialized on the second device with the decrypted computed initialization data. The encryption initialization data reduces a number of calculations needed on the second device to initialize the first private-key encryption method. At Step 174, encrypted messages are exchanged between the second device and the first device, thereby creating a cryptographically secure communications channel between the second device and the first device. The encrypted messages are encrypted using the selected Blowfish private session key and the first private-key encryption method initialized with the decrypted computed initialization data.

Method 158 is illustrated with an exemplary embodiment including specific components. However, the present invention is not limited to this embodiment or components and other embodiments and components can also be used to practice the invention.

Method 158 is illustrated using RSA as a public-key encryption method and the Blowfish block cipher as a private-key encryption method. However, the present invention is not limited to RSA and Blowfish, and virtually any public-key encryption method, any type of public-key encryption acceleration data, and any private key encryption method or any type of private-key encryption initialization data can be used to practice the invention.

In such an exemplary embodiment, in FIG. 6A at Step 160, RSA acceleration data and a RSA public key is received on a second device 102–110 in an unencrypted format from a first device 114 via the communications network 112. The RSA encryption acceleration data was computed on the first device 114 using the RSA public key from the RSA encryption method. In one embodiment of the present invention, the second device 102–110 is a thin-client device and the first device is a server device 114 with more device resources than the thin-client device. However, the present invention is not limited to this embodiment and other types of devices can also be used.

At Step 162, a private session key is selected for the Blowfish block cipher encryption method on the second device 102–110. At Step 164, the private session key is encrypted with the RSA encryption method using the RSA acceleration data and the RSA public key received from the first device. The RSA acceleration data reduces a number of calculations needed on the second device 102–110 to encrypt the selected private session key for the Blowfish block cipher encryption method to be used to exchange encrypted messages between the first device 114 and the second device 102–110.

At Step 166, the RSA encrypted private session key is sent to the fist device. At Step 168, encrypted Blowfish block cipher initialization data is received on the second device 102–110 from the first device. The computed Blowfish block cipher initialization data includes S-boxes and P-arrays and is used to initialize the Blowfish block cipher encryption method on the second device 102–110. The computed Blowfish block cipher initialization data was encrypted with a second private-key encryption method such as a pseudo one-time pad, etc. on the first device 114 using the selected private session key.

In FIG. 6B at Step 170, the encrypted computed Blowfish block cipher initialization data is decrypted on the second device 102–110 using the selected private session key. At Step 172, the Blowfish block cipher encryption method is initialized on the second device 102–110 with the decrypted computed Blowfish block cipher initialization data. The initialization data reduces a number of calculations needed on the second device 102–110 to initialize the Blowfish block cipher encryption method.

At Step 174, encrypted messages are exchanged between the second device 102∠ and the first device, thereby creating a cryptographically s channel 118 between the second device 102–110 and the first device. The encrypted messages are encrypted using the selected private session key and the Blowfish block cipher encryption method initialized with the decrypted computed Blowfish block cipher initialization data.

Method 158 helps reduce encryption initialization time between the first device 114 and second device 102–110 via the second device 102–110 since the encryption acceleration data and the encryption initialization data reduce a number of calculations needed on the second device 102–110 to initialize and utilized the selected private-key encryption method. Method 158 also helps reduce the overall time needed to create the cryptographically secure communications channel 118 between the first device 114 and the second device 102–110.

The methods and system described herein were described with respect to client devices 102–110 that have less device resources than a server device 114. However, the present invention is not limited to such an embodiment and can be used to accelerate the creation of a cryptographically secure communications channel 118 for a first device and a second device with an equal amount of device resources, or with first and second peer devices communicating peer-to-peer.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for accelerating data encryption, comprising:
exchanging between a first device and a second device via a communications network an encrypted private session key for a private-key encryption method using a public-key encryption method, wherein encryption acceleration data is computed on the first device using a public key for the public-key encryption method,
wherein the encryption acceleration data and the public key are sent to and used on the second device to encrypt the private session key exchanged between the first device and second device, and wherein the encryption acceleration data reduces a number of calculations needed on the second device to encrypt the private session key;
initializing the private-key encryption method on the first device and second device using the exchanged private session key,
wherein the private-key encryption method is initialized on the second device using encryption initialization data for the private-key encryption method computed on the first device using the exchanged private session key and sent to the second device, and wherein the encryption initialization data reduces a number of calculations needed on the second device to initialize the private-key encryption method; and exchanging encrypted messages between the first device and the second device, thereby creating a cryptographically secure communications channel between the first device and the second device, wherein the encrypted messages are encrypted using the exchanged private session key and the private-key encryption method initialized with the encryption initialization data.

2. The method of claim 1 further comprising a computer readable medium having stored therein instructions for causing a processor to execute the steps of the method.

3. The method of claim 1 wherein the first device has more device resources than the second device.

4. The method of claim 1 wherein the first device is a server device and the second device is a thin-client device.

5. The method of claim 4 wherein the thin-client device includes a mobile phone, personal digital assistant (PDA), two-way pager or a set-top box.

6. The method of claim 1 wherein the acceleration data includes pre-computed data for a public-key encryption method used to encrypt the private session key.

7. The method of claim 1 wherein the encryption acceleration data includes pre-computed variables used for modular expansion used during the public-key encryption of the private session key.

8. The method of claim 1 wherein the encryption initialization data includes S-box and P-array encryption initialization data for a private-key block cipher encryption method.

9. The method of claim 1 wherein the public-key encryption method includes the RSA public-key encryption method.

10. The method of claim 1 wherein the private-key encryption method includes a block cipher private-key encryption method.

11. The method of claim 10 wherein the private-key encryption method includes the Blowfish block cipher private-key encryption method.

12. A method for accelerating data encryption, comprising:

computing encryption acceleration data on a first device using a public key from a public-key encryption method;

sending the computed encryption acceleration data and the public encryption key in an unencrypted format from the first device to a second device via a communications network, wherein the computed encryption acceleration data reduces a number of calculations needed on the second device to encrypt a private session key used with a first private-key encryption method used to exchange encrypted messages between the first device and the second device;

receiving an encrypted private session key on the first device from the second device, wherein the encrypted private session key was encrypted using the computed encryption acceleration data and the public encryption key, and wherein the private session key will be used to encrypt data for the first private-key encryption method;

decrypting the encrypted private session key on the first device using a private encryption key for the public-key encryption method;

computing encryption initialization data for the first private-key encryption method using the decrypted private session key;

encrypting the computed encryption initialization data using a second private-key encryption method and the decrypted private session key;

sending the encrypted computed encryption initialization data from the first device to the second device, wherein the computed encryption initialization data is used to initialize the first private-key encryption method on the second device, and wherein the computed encryption initialization data reduces a number of calculations needed on the second device to initialize the first private-key encryption method; and exchanging encrypted messages between the first device and the second device, thereby creating a cryptographically secure communications channel between the first device and the second device, wherein the encrypted messages are encrypted using the private session key and the first private-key encryption method.

13. The method of claim 12 further comprising a computer readable medium having stored therein instructions for causing a processor to execute the steps of the method.

14. The method of claim 12 wherein the step of computing encryption acceleration data includes computing RSA encryption acceleration data.

15. The method of claim 12 wherein the step of computing encryption initialization data for the first private-key encryption method includes computing encryption initialization data for a block cipher private-key encryption method.

16. The method of claim 15 wherein the block cipher private-key encryption method includes the Blowfish block cipher private-key encryption method.

17. The method of claim 12 wherein the first device has more device resources than the second device.

18. The method of claim 12 wherein the first device is a sewer device and the second device is a thin-client device.

19. The method of claim 18 wherein the thin-client device includes a mobile phone, personal digital assistant (PDA), a two-way pager, or a set-top box.

20. A method for accelerating data encryption, comprising:

receiving on a second device via a communications network, encryption acceleration data and a public encryption key in an unencrypted format from a first device, wherein the encryption acceleration data was computed on the first device using the public encryption key from a public-key encryption method;

selecting a private session key for the first private-key encryption method on the second device;

encrypting the private session key with the public-key encryption method using the encryption acceleration data and the public encryption key received from the first device, wherein the encryption acceleration data reduces a number of calculations needed on the second device to encrypt the selected private session key for the first private-key encryption method to be used to exchange encrypted messages between the first device and the second device;

sending the encrypted private session key to the first device;

receiving computed encryption initialization data in an encrypted format from the first device, wherein the computed encryption initialization data is used to initialize the first private-key encryption method on the second device, and wherein the computed encryption initialization data was encrypted with a second private-key encryption method on the first device using the selected private session key;

decrypting the encrypted computed encryption initialization data on the second device using the selected private session key;

initializing the first private-key encryption method on the second device with the decrypted computed encryption initialization data, wherein the computed encryption initialization data reduces a number of calculations needed on the second device to initialize the first private-key encryption method;

exchanging encrypted messages between the second device and the first device, thereby creating a cryptographically secure communications channel between the second device and the first device, wherein the encrypted messages are encrypted using the selected private session key and the first private-key encryption method initialized with the decrypted computed initialization data.

21. The method of claim 20 further comprising a computer readable medium having stored therein instructions for causing a processor to execute the steps of the method.

22. The method of claim 20 wherein the step of receiving on a second device encryption acceleration data and a public encryption key includes receiving RSA encryption acceleration data and a RSA public encryption key.

23. The method of claim 20 wherein the step of receiving computed encryption initialization data for the first private-key encryption method includes receiving computed encryption initialization data for a block cipher private-key encryption method.

24. The method of claim 23 wherein the block cipher private-key encryption method includes the Blowfish block cipher private-key encryption method.

25. The method of claim 20 wherein the second private-key encryption method is a pseudo one-time pad encryption method.

26. The method of claim 20 wherein the first device has more device resources than the second device.

27. The method of claim 20 wherein the first device is a server device and the second device is a thin-client device.

28. The method of claim 20 wherein the thin-client device includes a mobile phone, personal digital assistant (PDA), a two-way pager, or a set-top box.

29. An encryption acceleration system, comprising in combination:

a first device;

a second device;

a communications network connecting the first device and the second device;

encryption acceleration data calculated on a first device using a public key for a public key encryption method, wherein the encryption acceleration data and the public key are sent to and used on the second device to encrypt a private session key for a private-key encryption method exchanged between the first device and second device, and wherein the encryption acceleration data reduces a number of calculations needed on the second device to encrypt the private session key;

computed encryption initialization data, wherein the computed encryption initialization data is computed on the first device and sent from the first device to the second device, wherein the computed encryption initialization data is used to initialize the private-key encryption method on the second device, and wherein the computed encryption initialization data reduces a number of calculations needed on the second device to initialize the first private-key encryption method; and a cryptographically secure communications channel between the second device and the first device over a communications network, wherein encrypted messages sent via the cryptographically secure communications channel are encrypted using the private session key and the private-key encryption method initialized with the computed encryption initialization data.

30. The system of claim 29 wherein the first device has more device resources than the second device.

31. The system of claim 29 wherein the first device is a server device and the second device is a thin-client device.

* * * * *